March 10, 1970  H. GIRAUD ET AL  3,499,657
CHUCK FOR A MACHINE TOOL
Filed Sept. 9, 1966
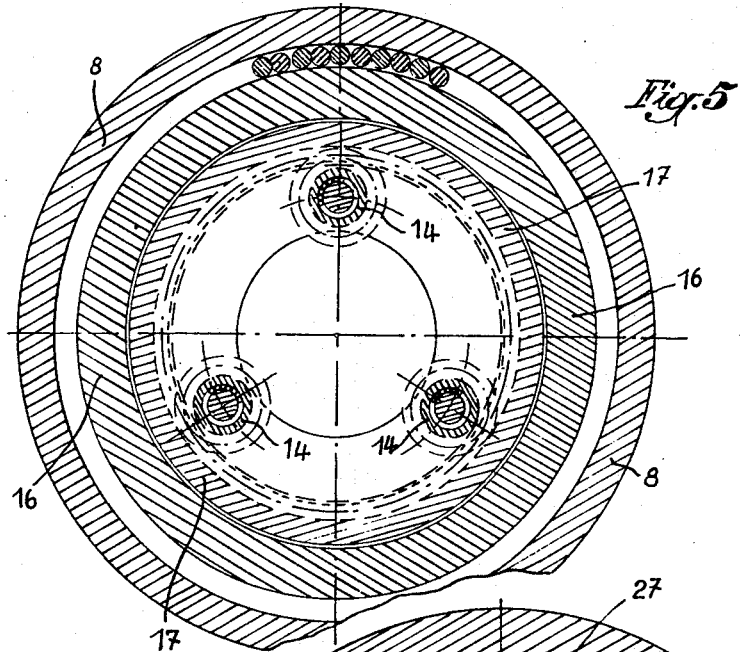
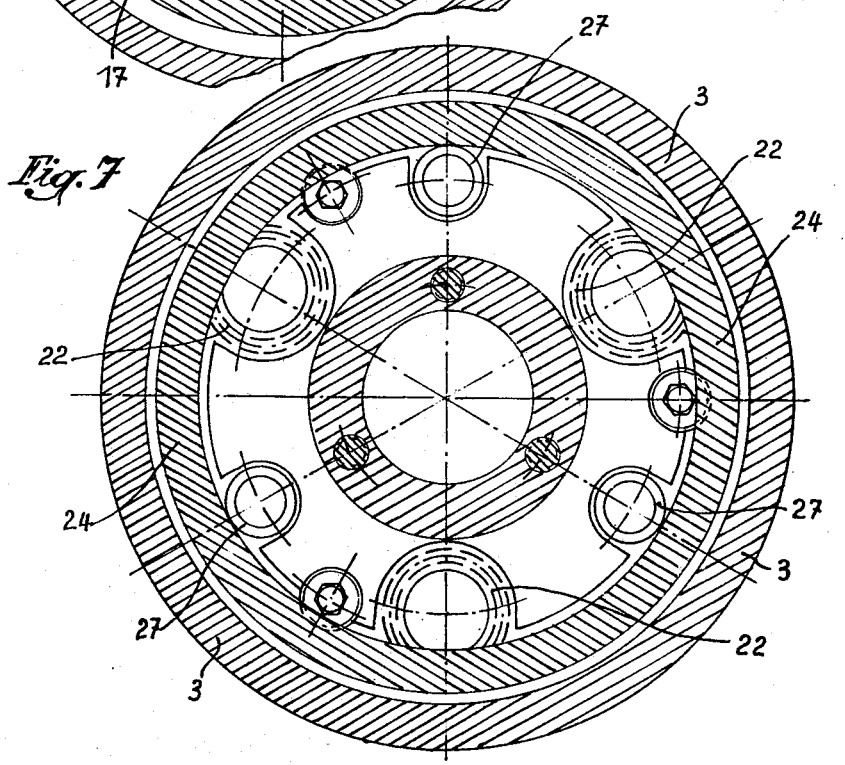

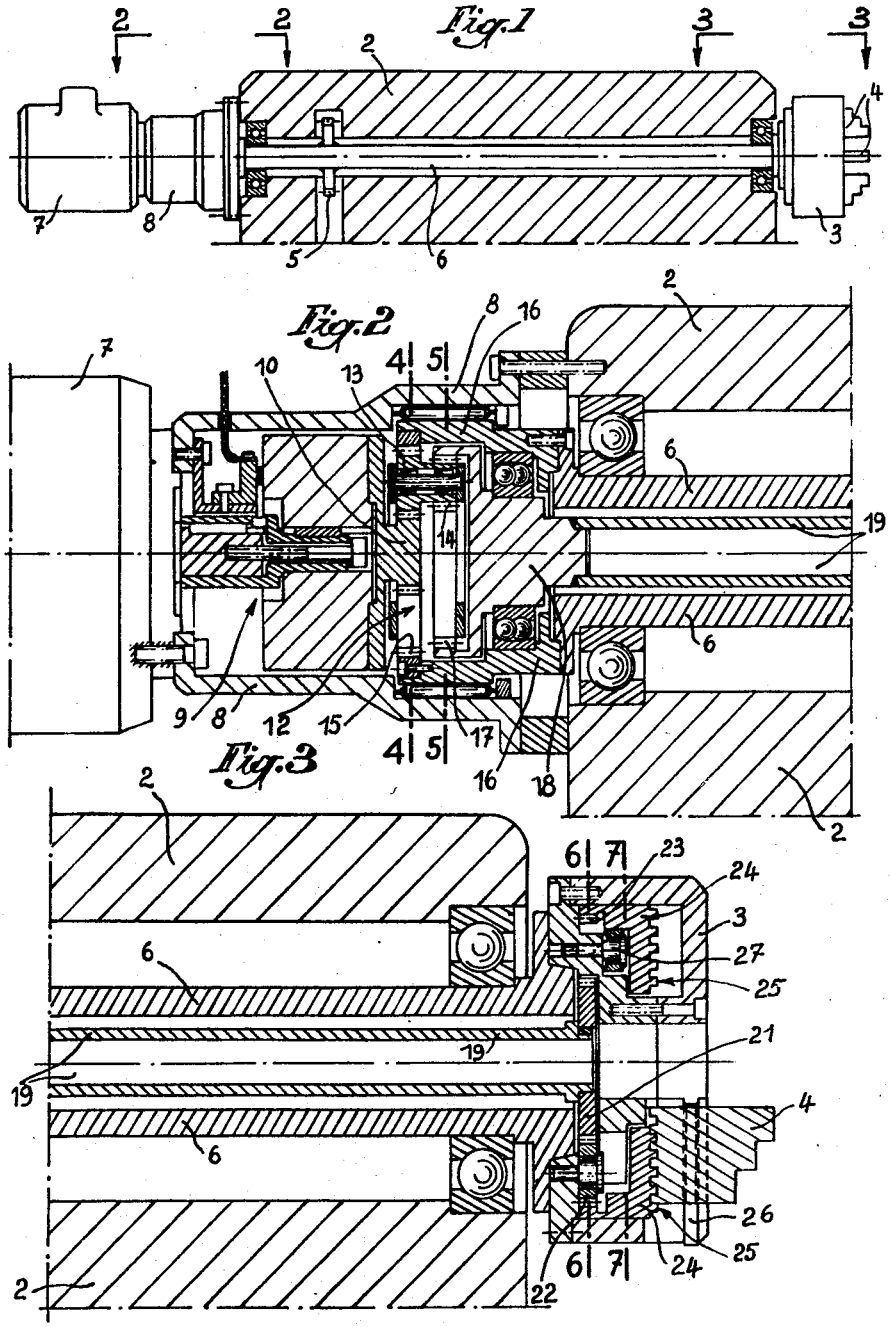

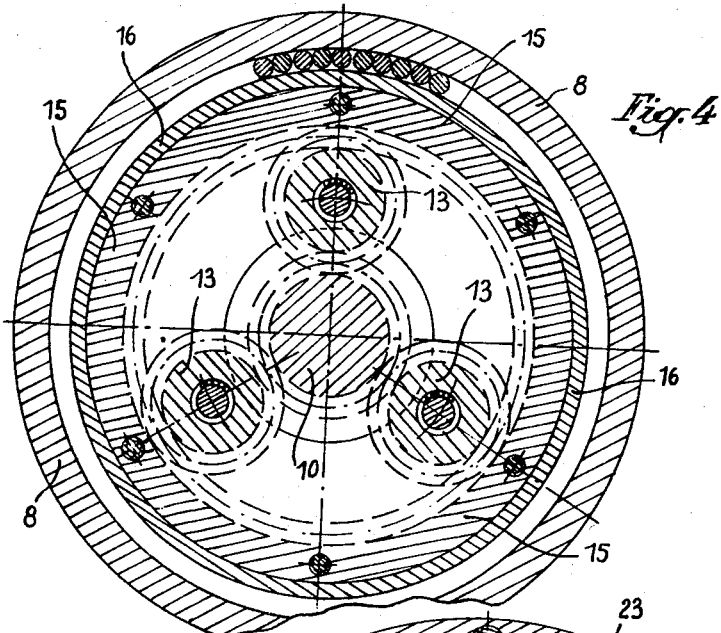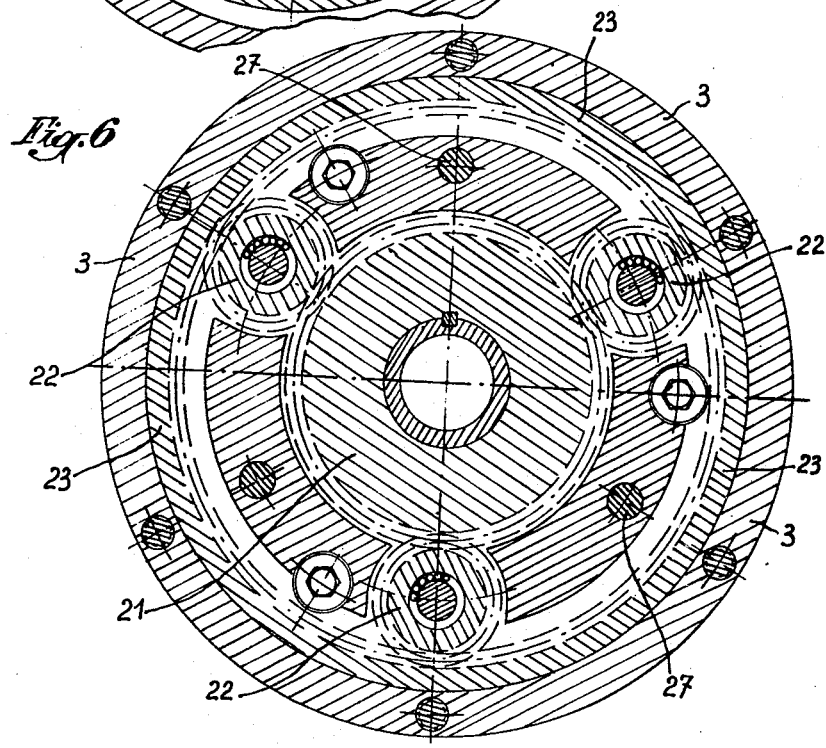

United States Patent Office 3,499,657
Patented Mar. 10, 1970

3,499,657
CHUCK FOR A MACHINE TOOL
Henri Giraud, 24 Rue Baudin, and Vincent Martin, 44 Rue de Champrond, both of Saint-Etienne, Loire, France
Filed Sept. 9, 1966, Ser. No. 578,223
Claims priority, application France, Sept. 13, 1965, 9,276
Int. Cl. B23b 31/16, 5/22, 5/34
U.S. Cl. 279—114   3 Claims

ABSTRACT OF THE DISCLOSURE

A machine tool having a chuck with radially guided jaws driven by a rotatable member, either inwardly or outwardly, from a reversible motor, through a planetary differential system acting as a reduction gear and a coupling for the selective engagement and disengagement of the planetary system with the motor. Preferably the coupling is of electromagnetic powder type.

---

This invention relates to a chuck for a machine tool.

A manually actuated type of chuck has two disadvantages: it is time-consuming both in the engaging of a workpiece and in the releasing of the workpiece; and it cannot ensure that successive workpieces are gripped with the same intensity, so that there can therefore be either excessive gripping, harmful to the piece to be machined, or insufficient gripping liable to lead to accidents.

The known types of power-actuated chucks, which may be electrical, pneumatic, or hydraulic, are speedy in operation, both as to the engaging of a workpiece and the releasing of it, and can apply a constant intensity of gripping. However, power-actuated chucks are mainly only suitable for the machining of a run of similar workpieces, because their gripping action can only be applied during a small radial movement of their jaws. In order to change from the machining of one workpiece of particular dimensions to another of substantially different dimensions, it is necessary to carry out appropriate manual adjustment of the jaws along their radial slides, so that the machine tools in which they are used are idle for an appreciable time. Moreover, they have the disadvantage that complex and troublesome installations, particularly if the actuation is pneumatic or hydraulic, are necessary.

Therefore at the present time there does not exist any chuck that at once presents the following properties sought for by the users:

Automatic operation for gripping and slackening; immediate application to workpieces of a wide range of sizes; precise control of intensity of gripping, internal or external; simplicity and consequently modest cost.

An object of the invention is to provide a chuck in which these properties are combined.

According to the present invention, a chuck for a machine is provided which comprises radially-guided jaws, and a rotatable member interconnected with the jaws to effect radial movement of the jaws, both inwardly and outwardly, in accordance with its direction of rotation combined with a reversible motor, a planetary differential reduction device, and a coupling for the engagement to and the disengagement from the motor of the said device, the said device being in driving connection with the rotatable member of the chuck.

In accordance with the direction of rotation of the motor, the jaws are moved inwards or outwards, either to grip a workpiece or to release it, in accordance with whether the workpiece requires to be gripped externally or internally; and, whatever the extent of radial movement required of the jaws to bring them into gripping contact with the workpiece, the motor-driven operation effects the movement rapidly.

The intensity of gripping is predetermined, and constant as between successive workpieces of the same dimensions. To allow for controlling of the gripping intensity, with gripping that can moreover be effected by the displacement of the jaws in one direction or the other, according as the workpiece is held externally or internally, it is of advantage to use a variable torque electric motor. However, any other type of electric motor may be used, with a suitable coupling, to provide the gripping torque. In any event, it is preferred to use an electro-magnetic powder coupling having means for controlling the transmitted torque.

A preferred planetary differential device has first and second interconnected groups of planetary pinions, a sun-wheel driven by the coupling and in mesh with the pinions of the first group, a first internal gear in mesh with the pinions of the first group, a hollow spindle in direct rotatable connection with the chuck, the first internal gear being secured to the hollow spindle, a second internal gear in mesh with the pinions of the second group, a driving member extending concentrically through the hollow spindle, to which driving member the second internal gear is secured, a sunwheel internally of the chuck and secured to the driving member, a third group of planetary pinions in mesh with the sunwheel in the chuck, and an internal gear secured to the rotatable member in the chuck and in mesh with the third group of planetary pinions.

A chuck having a planetary differential device as above described appears in detail in the accompanying drawing of an embodiment of the invention, now to be descirbed purely by way of example. In the drawing:

FIGURE 1 is a side elevation view of the chuck, as assembled in a lathe, part of the body of which is shown in section;

FIGURES 2 and 3 are, to a larger scale, views in axial section along lines 2—2 and 3—3 respectively in FIGURE 1;

FIGURES 4 and 5 are transverse sections along lines 4—4 and 5—5 respectively in FIGURE 2; and FIGURES 6 and 7 are transverse sections along lines 6—6 and 7—7 respectively in FIGURE 3.

In FIGURE 1, 2 indicates the body of a machine tool, for example a lathe, and 3 indicates a chuck, fitted with radially movable jaws 4. The chuck is secured to one end of a hollow spindle 6, to which is keyed a gear 5, or alternatively a pulley for the driving of the shaft and the chuck from a motor (not shown). It will be understood that the check 3 could be mounted in a machine tool other than a lathe.

Beyond the other end of the shaft 6 from that at which the chuck 3 is carried, there is an electric motor 7, of reversible type, which has its frame connected by the casing of a gearbox 8 to the body 2 of the lathe. The shaft of the motor 2 drives an electro-magnetic powder coupling 9 inside the gearbox 8, the coupling 9 having the usual means for controlling the value of its output torque, transmitted by a pinion 10, FIGURE 2).

The pinion 10 forms a sunwheel of a differential planetary speed reducer 12 also located inside the gearbox 8. The sunwheel 10 meshes with a first group of three planetary pinions 13, each of which is directly connected with a corresponding pinion 14 of a second group. The pinions 14 are of smaller diameter than the pinions 13. The pinions 13 are in mesh with an internal toothed gear 15 carried by a sleeve 16 secured to the spindle 6. The pinions 14 are in mesh with an internal gear 17 of a head 18 secured to an extended tube 19 concentrically and internally of the hollow spindle 6.

At the opposite end, i.e., adjacent the chuck 3, tube 19 carries a sunwheel 21 with which planetary pinions 22 of a third group are in mesh, pinion 22 being carried by a ring which is fastened to the casing of chuck 3 by means of pins 27, the pinions 22 themselves being in mesh with an internal gear 23 carried by an annular member 24 rotatably mounted inside the chuck 3. The front face of the rotatable member 24 is formed with a scroll 25, with which are engaged correspondingly toothed backs of the jaws 4, mounted so as to slide in radial slots 26 in the front of the chuck 3.

The gripping and releasing of the jaws 4 of the chuck 3 at one end of the shaft 6 are controlled by the motor 7 and the coupling 9 and the differential mechanism inside the gearbox 8, connected to the chuck 3 by the tube 9 and the further differential mechanism 21, 22, 23.

When the lathe is being used normally, i.e., when the jaws 4 of the chuck 3 hold a workpiece to be machined, either externally or internally, depending on the machining to be done on the workpiece, the electric motor 7 is off. There is then no driving connection between the sunwheel 10 forming the output end of the coupling 9 and the motor 7. The spindle 6 of the lathe is rotated by the gear 5 to rotate the chuck 3 and the workpiece held by the chuck.

During this rotation of the spindle 6, the first and second groups of planetary pinions 13, 14 do not rotate about their own axes, but serve to effect rotary drive of the internal gear 17 on the tube 19 (and incidentally, the sunwheel 10 also) at the same speed as the spindle 6. The tube 19 thus rotating at the same speed as the shaft 6, the sunwheel 21, the third group of pinions 22, and the internal gear 23 adjacent the chuck 3 all rotate together with the chuck. There is therefore no rotation of the member 24 formed with the scroll 25.

To open the chuck 3 to release the machined workpiece, at any stage during machining, the spindle 6 that drives the chuck is stopped. The electric motor 7 is then actuated, in such a manner as to turn in the direction corresponding to opening of the chuck. This rotation of the motor 7, while the spindle 6 and thus the sleeve 16 and the gear 15 are stationary, brings about positive rotation of the sunwheel 10 and thus the orbiting displacement of the first and second groups of planetary pinions 13 and 14 of the planetary differential reducing device. The pinions 14 having a smaller diameter than that of the pinions 13, there follows the rotary driving, at reduced speed, of the gear 17 and thus of the head 18 and the tube 19. The tube 19 thus drives the sunwheel 21 and, because the internal gear 23 is stationary (the chuck 3 being stationary), the third group of planetary pinions 22 rotate around the sunwheel 21 and cause the annular member 24 to rotate. The resultant rotation of the scroll 25 leads automatically to the radial displacement of the jaws 4 in the required opening direction, in accordance with the direction of rotation of the motor 7.

The clamping of the jaws 4 on a fresh workpiece takes place in similar manner, by simple reversal of the direction of rotation of the motor 7. The intensity of gripping on the workpiece is determined by the control exercised by the coupling 9. When the desired gripping torque is reached, the sunwheel 10 is automatically disengaged from the motor 7.

What we claim is:

1. A chuck for a machine tool comprising radially-guided jaws, and a rotatable member interconnected with the jaws to effect radial movement of the jaws, both inwardly and outwardly, in accordance with its direction of rotation, a reversible motor, a planetary differential reduction device, having first and second groups of planetary pinions, the respective pinions of the two groups being inter-connected, an internal gear rotatable with the chuck and meshing with the pinions of the first group, a disengageable coupling driven by the motor, a sunwheel driven by the coupling and meshing with the said pinions of the first group, an internal gear meshing with the pinions of the second group, a third group of planetary pinions rotatable with the rotatable member of the chuck, an internal gear in the chuck and meshing with the pinions of the third group, and a sun-wheel in driving connection with the internal gear that meshes with the pinions of the second group, and itself in mesh with the pinions of the third group.

2. A chuck as in claim 1, wherein the chuck is secured to a hollow driving shaft, and driving connection is provided to the sunwheel that is in mesh with the pinions of the third group by a member that extends through the hollow shaft.

3. A chuck as in claim 2, wherein the pinions of the second group are smaller in diameter than the pinions of the first group, a sleeve secured to the hollow shaft having the internal gear for the pinions of the first group, and a head secured to the member extending through the hollow shaft having the internal gear for the pinions of the second group.

References Cited

UNITED STATES PATENTS

| | | | |
|---|---|---|---|
| 1,441,803 | 1/1923 | Hay | 279—114 |
| 1,608,462 | 11/1926 | Cutler | 279—114 |
| 1,772,203 | 8/1930 | Bush | 279—114 |
| 2,687,054 | 8/1954 | Nelson | 81—52.4 |
| 2,952,177 | 9/1960 | Skillin | 279—114 X |

ROBERT C. RIORDON, Primary Examiner

J. C. PETERS, Assistant Examiner